(12) United States Patent
Birch

(10) Patent No.: US 7,181,037 B2
(45) Date of Patent: Feb. 20, 2007

(54) HEADSET WITH ADJUSTABLE MICROPHONE BOOM

(75) Inventor: Ole Birch, Nærum (DK)

(73) Assignee: GN Netcom A/S (DK)

( * ) Notice: Subject to any disclaimer, the term of this patent is extended or adjusted under 35 U.S.C. 154(b) by 10 days.

(21) Appl. No.: 10/471,928

(22) PCT Filed: Mar. 13, 2002

(86) PCT No.: PCT/DK02/00166

§ 371 (c)(1),
(2), (4) Date: Feb. 23, 2004

(87) PCT Pub. No.: WO02/076147

PCT Pub. Date: Sep. 26, 2002

(65) Prior Publication Data

US 2004/0125978 A1    Jul. 1, 2004

(30) Foreign Application Priority Data

Mar. 16, 2001  (DK) ............................... 2001 00452

(51) Int. Cl.
*H04R 25/00*      (2006.01)
(52) U.S. Cl. ........................ 381/375; 381/370; 381/379
(58) Field of Classification Search ................ 381/362, 381/370, 374, 375, 379, 382; 379/430
See application file for complete search history.

(56) References Cited

U.S. PATENT DOCUMENTS

| | | | |
|---|---|---|---|
| 5,469,505 A | 11/1995 | Gattey et al. | |
| 5,533,122 A | 7/1996 | Gattey et al. | |
| 5,793,878 A | 8/1998 | Chang | |
| 5,960,094 A * | 9/1999 | Jensen et al. | 381/381 |
| 6,097,809 A | 8/2000 | Lucey et al. | |
| 2002/0131616 A1* | 9/2002 | Bronnikov et al. | 381/370 |

FOREIGN PATENT DOCUMENTS

| | | |
|---|---|---|
| EP | 1 052 829 A2 | 11/2000 |
| WO | WO 00/55673 | 9/2000 |

* cited by examiner

*Primary Examiner*—Suhan Ni
(74) *Attorney, Agent, or Firm*—Allen Law Group, LLC

(57) ABSTRACT

A headset with an adjustable microphone boom which can be adjusted to and from a position near the mouth of a user and is mounted in a housing by a friction part being coupled to a flexible friction coupling which is configured in a plate in that co-operating plates are stamped out of the plate and are connected to the plate by means of flexible arms. The friction part has a shaft which can be accommodated in a bearing defined by recesses which are configured partly in the inside of the housing and partly in the plate. The microphone boom, the housing and the plate with friction coupling are held together by means of a locking ring. In this way a stable, adjustable microphone boom is provided which does not become loose with time, understood in the way that no matter in which position and regardless of how frequently the position is changed, the microphone boom will remain secured with a sufficient force in the friction coupling.

22 Claims, 2 Drawing Sheets

HEADSET WITH ADJUSTABLE MICROPHONE BOOM

TITLE OF THE INVENTION

1. Techincal Field

The invention concerns a headset with an adjustable microphone boom, which is swingable to or from a user's cheek, where the boom is mounted in a bearing provided in a housing, the microphone boom being suspended in the housing by a friction part configured on the microphone boom.

2. Background

Such headsets are to be found in increasingly widespread use, e.g. among personnel at reception desks and by personnel engaged in telephonic sales.

Today, a modern headset is built up so that the user can wear it without any inconvenience arising in the form of discomfort due to the weight of the headset or its clamping around the head etc.

Moreover, if the headset is of the wireless type, it is seldom necessary for the user to remove the headset from the head.

In connection with periods during which the headset is not in use, it is desirable to be able to remove the microphone boom from the area around the mouth, e.g. in connection with the intake of food by the user.

The most common way in which to remove the microphone boom from the user's mouth is to turn it parallel with the loudspeaker capsule, and herewith approximately parallel with the user's cheek. However, it may be desirable to move the microphone boom away and at a distance from the cheek, so that, for example during the intake of food, there is no risk that it comes into contact with the food.

U.S. Pat. No. 5,469,505 discloses a headset, where the microphone boom can be swung away from a user's cheek in that the boom is configured with two hinge joints which are mutually displaced by 90°.

Such a swinging to and from the cheek must naturally be able to be effected during the whole lifetime of the headset, and without the microphone boom becoming loose with the result that it cannot be secured in any fixed position. This requirement places great demands on the manner in which the microphone boom is coupled to the headset.

BRIEF SUMMARY OF THE INVENTION

In light of this, it is an object of the invention to provide a headset whereby a stable swinging-out of a headset's microphone is possible throughout the whole lifetime of the headset.

The object of the invention is achieved with a headset of the kind disclosed in the preamble to claim 1 which is characterized in that the friction part is suspended in a flexible arrangement that consists of a friction coupling.

In this way, a stable coupling of the microphone boom to the headset is achieved in that the flexible suspension will compensate for wear which would otherwise make the coupling-together become loose and perhaps make it impossible to position the microphone boom.

As disclosed in claim 2, it is expedient that the friction coupling is configured in a plate disposed in the housing. This further ensures, after long-time use, that play does not arise in the flexible arrangement when the microphone boom is moved.

For further stabilisation of the headset bearing, as disclosed in claim 3, it is expedient if the friction part has a transverse shaft which is arranged to secure the microphone boom in recesses formed in the inside of the housing and, as disclosed in claim 4, that in the plate on that side which faces towards the inside of the housing, further recesses are configured which, together with the recesses in the inside of the housing, completely surround the shaft.

As disclosed in claim 5, for reasons of advantageous production technique, it is an advantage if the friction coupling is configured as a stamped-out part of the plate.

To ensure a good and durable connection between the microphone boom's bearing part and the stamped-out part, as disclosed in claim 6, it is advantageous if the stamped-out part consists of two plates which are arranged to accommodate the friction part between two of their surfaces. In this way, a secure grip is obtained around the friction part which, due to the spring effect from the two plates against the friction part, maintains a force sufficient to secure the friction part after long-time use.

For a simple coupling of the microphone boom's bearing part to the housing with its flexible friction coupling, as disclosed in claim 11, it is expedient if the inside of the housing has a circle-disk shaped surface, from which a wall with cut-outs extends outwards, and in claim 12, that the microphone boom, the housing and the plate are coupled together with a locking ring.

Further expedient embodiments of the invention are disclosed in the remaining, dependent claims.

BRIEF DESCRIPTION OF THE SEVERAL VIEWS OF THE DRAWINGS

The invention will now be explained in more detail with reference to the example embodiment shown in the drawing, in which FIG. 2 shows a section along the line II—II in FIG. 1, while

DETAILED DESCRIPTION

Figure 1:
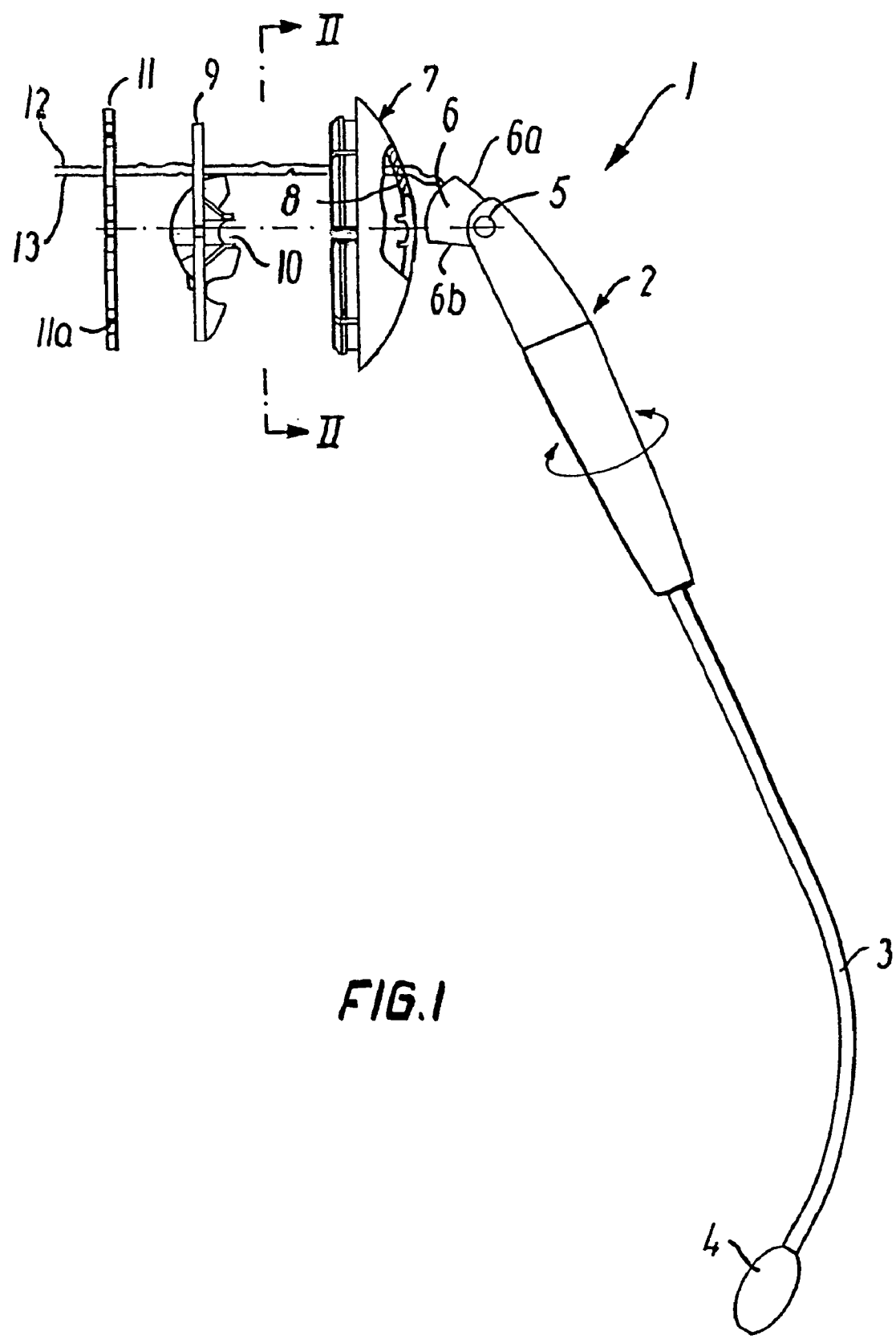
FIG. 1 shows, seen from the side, a microphone boom with bearing parts according to the invention in the dismantled state.

In FIG. 1, a microphone boom in its entirety is indicated by the reference number 1. As will be seen, at its one end it consists of a microphone 4 which is secured to the one end of a boom 3, while the other end of the boom 3 is connected to a pivotal adjusting piece 2. The adjusting piece 2 ends at a friction part 6 which has two opposing surfaces 6a and 6b. The friction part 6 is pivotally connected to the adjusting part 2 by means of a shaft 5 which extends through the adjusting piece 2 and the friction part 6. This shaft 5 extends out through both sides of the adjusting part 2.

FIG. 1 also shows a housing 7 which is arranged to receive the friction part 6 and a plate 9 with bearing 10, as explained in more detail in the following.

Finally, FIG. 1 shows a locking ring 11 which is arranged to hold the plate 9 firmly in the housing 7.

Figure 2:
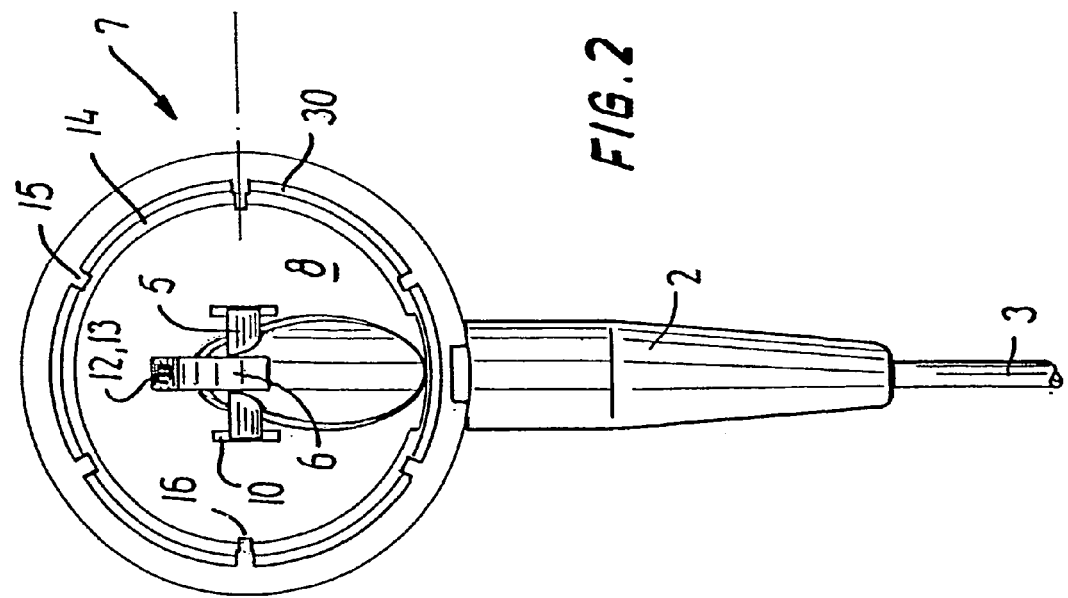

In FIG. 2, the housing is shown again seen in the direction II—II and with the friction part 6 inserted in the housing. As will be seen, the shaft 5 with the friction part 6 is mounted in recesses in the form of bearing shells in the inside of the housing (in FIG. 2 partially hidden by the shaft 5). In the inside of the housing 7 a circular-disk shaped recess 14 is also provided, from which a wall 30 with cut-outs 15 extends outwards. The inside of the housing 7 is also provided with lugs 16, which are intended to co-operate with recesses 17 (see FIG. 3) in the plate 9.

Figure 3:
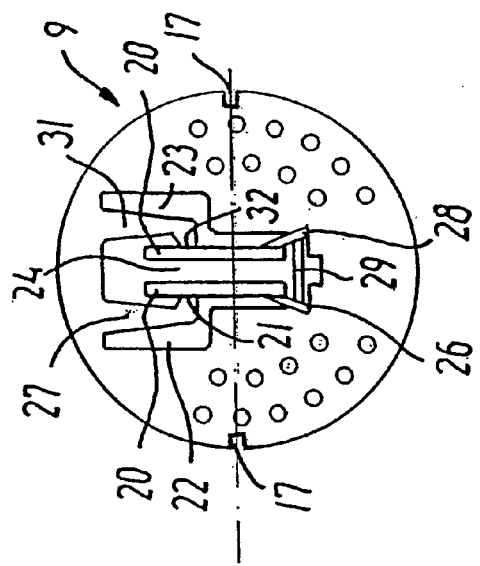
FIG. 3 shows a friction coupling on a plate according to the invention.

In FIG. 3, the plate 9 is seen with a flexible friction coupling according to the invention. On the opposite side of the plate 9, recesses in the form of bearing shells (not shown) are formed which, together with the bearing shells on the inside of the housing 7, constitute the bearing 10 which surrounds the shaft 5 when the plate 9 is inserted in abutment against the surface 14.

In the plate 9 a flexible friction coupling according to the invention is configured. This flexible friction coupling consists of two plates 20 which are connected to resilient arms 21, 27, 31, 32 and to securing pieces 26 and 28. The resilient arms, the plates 20 and the securing pieces 26, 28 are configured by the stamping-out of material in the plate 9, shown by a downwardly decreasing opening 24 between the plates 20 and shown at cut-outs 22 and 23.

The parts illustrated in the figures are assembled in the following manner:

The friction part 6 is introduced into the inside of the housing 7 from the right in FIG. 1. The friction part 6, which has a slightly larger breadth than the opening 24 between the plates 20, is now pressed in between the plates 20, whereby a force is applied to the friction part 6 which is determined by the spring effect of the arms 21, 27, 31 and 32. At the same time, the shaft 5 is mounted in the bearing shells of the housing 7 and on the coupling plate 9, said bearing shells together forming the bearing 10. To hold all of the parts together, the locking ring 11 is mounted against the inside of the housing 7. In this way, the microphone boom can be moved in an angular area which is defined by a distance limited by the surfaces 6a and 6b of the friction part 6 against the inner surface 8 of the housing and the boundary 29 of the friction coupling, respectively, as shown in FIGS. 1 and 3, respectively.

Further, the friction will increase when the microphone boom is moved towards the boundary 29, which corresponds to moving it away from a user's cheek, since the extent of the opening 24 decreases downwards, as mentioned before.

The invention claimed is:

1. Headset with adjustable microphone boom, which is swingable to or from a user's cheek, where the boom is mounted in a bearing provided in a housing, the microphone boom being suspended in the housing by a friction part configured on the microphone boom, wherein the friction part is suspended in a flexible arrangement that includes a friction coupling, so that, when said friction part engages said flexible arrangement, the movement of the boom from a position adjacent the user cheek to a position distant therefrom and wherein the friction coupling comprises a pair of opposing surfaces flexibly biased toward said friction part.

2. Headset according to claim 1, wherein the friction coupling comprises a pair of parallel opposing surfaces flexibly biased on both sides of said friction part.

3. Headset according to claim 1, wherein the housing includes a recessed cradle and wherein said friction part includes a transverse axial shaft, said shaft being configured to secure the microphone boom in recesses and be rotatable therein where said boom is moved from the user's cheek to a point distant therefrom.

4. Headset according to claim 2, wherein the friction coupling is configured as a single unit as a part stamped out of a plate.

5. Headset according to claim 1, wherein said flexible arrangement comprises a pair of spaced apart elements biased toward each other, so that when said frictional part is interposed therebetween, the elements will engage said frictional part.

6. Headset according to claim 5, wherein the elements of the friction part has a breadth which is greater than the distance between the elements when the friction part is not introduced between the plates.

7. Headset according to claim 5, wherein the distance between the two elements decreases across their surface so as to provide increasing frictional engagement as the boom is positioned away from the cheek.

8. Headset according to claim 5, wherein the two elements are suspended flexible arms.

9. Headset according to claim 1, wherein the friction part is configured to rotate on an axis and wherein said friction part comprises a wedge of predefined angular extent and, said wedge being rotatable about said axis so that when the boom is moved an increasing portion of said wedge engages said flexible arrangement.

10. Headset according to claim 1, wherein the friction part has a pre-defined thickness and the flexible arrangement includes a pair of spaced apart biased members defining a space therebetween smaller than the thickness of the friction part.

11. Headset according to claim 2, the microphone boom, the house and the elements are coupled together with a locking ring.

12. Headset with adjustable microphone boom, which is swingable to or from a user's cheek, where the boom is mounted in a bearing provided in a housing, the microphone boom being suspended in the housing by a friction part configured on the microphone boom, wherein the friction part is suspended in a flexible arrangement that includes a friction coupling, so that, when said friction part engages said flexible arrangement, the movement of the boom from a position adjacent the user cheek to a position distant therefrom and wherein the friction coupling comprises a pair of opposing surfaces flexibly biased toward said friction wherein the housing includes a recessed cradle and wherein said friction part includes a transverse axial shaft, said shaft being configured to secure the microphone boom in recesses and be rotatable therein where said boom is moved from the user's cheek to a point distant therefrom, and wherein the plate is configured with further recesses which, together with the recesses on the inside of the housing, completely surround the shaft.

13. Headset with adjustable microphone boom, which is swingable to or from a user's cheek, where the boom is mounted in a bearing provided in a housing, the microphone boom being suspended in the housing by a friction part configured on the microphone boom, wherein the friction part is suspended in a flexible arrangement that includes a friction coupling, said coupling comprising opposing frictional engagement members flexibly biased toward each other, so that, when said friction part is, at least in part, positioned between said members, the moment of the boom is impeded by engagement of said frictional part and said engagement members.

14. The headset of claim 13, wherein friction between said frictional part and said engagement members is variable.

15. The headset of claim 13 wherein friction between the frictional part and said engagement members increases as the boom is moved.

16. The headset of claim 13, wherein the friction member is configured to increase its engagement with said engagement member as the boom is moved.

17. The headset of claim 13 wherein the friction member is a wedge which is insertable into the space between said engagement members.

18. The headset of claim 17 wherein said wedge has a variable thickness thereacross.

19. The headset of claim 17 wherein the boom and the wedge are attached to each other at a point of axial rotation.

20. The headset of claim 19 wherein an angle is defined between the wedge and said boom and whereby the distance the boom may be moved from the user's cheek is determined, in part, by said angle.

21. The headset of claim 13 wherein said housing includes a stop and wherein said friction part is configured to contact the stop at its maximal distance from the user's cheek.

22. Headset comprising an adjustable microphone boom having part a major axis therealong, said boom being swingable to or from a user's cheek, and rotatable about its major axis, the boom is mounted in a bearing provided in a housing, a friction part configured on the microphone boom and a friction coupling in said housing wherein the friction part is slidably suspended in said friction coupling, said coupling comprising opposing frictional engagement members flexibly biased toward each other, so that, when said friction part is, at least in part, positioned between said members, the moment of the boom is impeded by engagement of said frictional part and said engagement members.

* * * * *